(12) United States Patent
Avitia et al.

(10) Patent No.: US 7,263,870 B2
(45) Date of Patent: Sep. 4, 2007

(54) GAUGE CALIBRATION METHOD

(75) Inventors: Cesar Avitia, Chihuahua (MX); Martin Joel Ibarra, Chihuahua (MX); Raul Antonio Rascon, Chihuahua (MX)

(73) Assignee: Visteon Global Technologies, Inc., Van Buren Township, MI (US)

( * ) Notice: Subject to any disclaimer, the term of this patent is extended or adjusted under 35 U.S.C. 154(b) by 106 days.

(21) Appl. No.: 11/210,419

(22) Filed: Aug. 24, 2005

(65) Prior Publication Data

US 2007/0044535 A1    Mar. 1, 2007

(51) Int. Cl.
*G01D 18/00* (2006.01)
*G01D 11/28* (2006.01)

(52) U.S. Cl. .................. 73/1.01; 73/866.1; 250/252.1; 250/231.11; 340/688; 362/23

(58) Field of Classification Search .. 356/141.4–141.5, 356/141.2; 73/1.01, 1.88, 866.1; 340/688; 250/252.1, 231.11; 362/23, 28
See application file for complete search history.

(56) References Cited

U.S. PATENT DOCUMENTS

| | | | | |
|---|---|---|---|---|
| 3,446,981 A | | 5/1969 | Ackerman et al. | ..... 250/231.11 |
| 3,573,773 A | | 4/1971 | O'Hanlon | .............. 340/870.27 |
| 3,698,307 A | * | 10/1972 | Reichardt | ................... 396/570 |
| 3,901,605 A | | 8/1975 | Brainard | .................. 356/141.4 |
| 3,906,345 A | | 9/1975 | Bertolasi | ..................... 324/166 |
| 3,980,075 A | * | 9/1976 | Heule | .......................... 600/479 |
| 4,037,219 A | * | 7/1977 | Lewis | .................... 340/870.22 |
| 4,107,661 A | | 8/1978 | Crosby | ......................... 340/688 |
| 4,275,393 A | | 6/1981 | Johnston | ..................... 340/688 |
| 4,511,798 A | * | 4/1985 | Killingsworth | ......... 250/231.13 |
| 4,631,539 A | | 12/1986 | Sanders et al. | ......... 340/870.29 |
| 5,635,622 A | | 6/1997 | King | ........................... 73/1.01 |
| 6,145,369 A | | 11/2000 | Corbin et al. | ................. 73/1.88 |
| 6,157,311 A | | 12/2000 | Berkovich | .................... 340/688 |
| 6,741,184 B1 | | 5/2004 | Miller et al. | ........... 340/815.78 |

* cited by examiner

*Primary Examiner*—Thomas P. Noland
(74) *Attorney, Agent, or Firm*—Brinks Hofer Gilson & Lione

(57) ABSTRACT

The instrument panel gauge assembly includes an applique having gauge graphics printed thereon and a needle pointer for a gauge assembly positioned adjacent thereto. A transparent chaplet is formed within the applique to allow light to pass through. The needle passes over the chaplet as the needle moves. When the needle is positioned directly in front of the chaplet, light is blocked from passing through the chaplet. A light sensing element is positioned behind the applique to detect the presence of light passing through the chaplet. A light baffle guides light passing through the chaplet to the light sensing element. A controller receives a signal from the light sensing element indicating when the needle pointer is directly in front of the chaplet. The controller then compares the actual input to the gauge with the position of the needle pointer, calculates a correction factor, and calibrates the gauge accordingly.

9 Claims, 4 Drawing Sheets

GAUGE CALIBRATION METHOD

BACKGROUND

1. Field of the Invention

The invention generally relates to a gauge assembly that is capable of auto-calibrating and a method of calibrating a gauge assembly.

2. Background of the Invention

Instrument cluster gauges must be calibrated to insure the accuracy of the gauge. Currently, calibration of instrument cluster gauges is done externally. This type of calibration requires the use of manufacturing floor space, represents a significant financial investment, and requires service and maintenance routines.

Referring to FIG. 1, a prior art gauge calibration system is shown generally at 10. An instrument cluster 12 is mounted within a fixture 14. A vision system 16 includes a digital camera 18 and lens 20. The camera 18 communicates with a host computer 22 via a camera video and control harness 24. The host computer controls the camera shutter (not shown), and processes the images from the digital camera 18. The host computer 22 also controls the instrument cluster 12 via a communication interface 26 that allows the instrument cluster 12 and the host computer to communicate.

The digital camera 18 takes an image of the gauges on the instrument cluster 12. Simultaneously, the host computer 22 sends a signal to the instrument cluster 12 simulating an input to the gauges. The host computer 22 then compares the actual position of the needle pointer (not shown) of the gauges on the instrument cluster 12 with the input signal and calibrates the gauges to accommodate for any error.

As previously stated, this type of calibration is costly and takes up time and space. Therefore, there is a need for an instrument cluster that is capable of internal auto-calibration and a method of auto-calibrating.

SUMMARY

An instrument panel gauge assembly in accordance with the teachings of the claims includes an applique having gauge graphics printed thereon. A needle pointer for a gauge assembly is positioned adjacent the applique. A transparent chaplet is formed within the applique to allow ambient light to pass through the applique. The transparent chaplet is positioned such that the needle pointer passes over the transparent chaplet as the needle pointer moves relative to the applique. In one aspect, the transparent chaplet is sized relative to the width of the needle pointer such that when the needle pointer is positioned directly in front of the transparent chaplet, ambient light is substantially blocked from passing through the transparent chaplet. A light sensing element is positioned behind the applique to detect the presence of light passing through the transparent chaplet and a light baffle is positioned behind the applique and adapted to guide light passing through the transparent chaplet to the light sensing element.

The light sensing element is adapted to send a signal to a controller. The signal indicates when the needle pointer is directly in front of the transparent chaplet based upon the absence of light passing through the transparent chaplet. The controller compares the actual input to the gauge with the position of the needle pointer, calculates a correction factor, and calibrates the gauge accordingly.

In another aspect, the light sensing element is one of a photoresistor, a photodiode, and a phototransistor and is adapted to send a signal to the controller for a voltage corresponding to the amount of light that the light sensing element is receiving.

In still another aspect, the light sensing element is adapted to send two signals. A first signal indicates that the light sensing element is receiving light, thereby indicating that the needle pointer is not positioned directly in front of the transparent chaplet. A second signal indicates that the light sensing element is not receiving light, thereby indicating that the needle pointer is positioned directly in front of the transparent chaplet.

In yet another aspect, the light sensing element is mounted onto a surface behind the applique and the light baffle is conical shaped and extends from a rear surface of the applique to the support surface onto which the light sensing element is mounted and the light sensing element is positioned within the conical shaped light baffle.

In still yet another aspect, the controller includes auto-calibration algorithms that are adapted to feed a known signal to the gauge assembly to cause the needle pointer to move, read an input from the light sensing element, compare the signal to the position of the needle pointer, and calculate a correction factor that is stored in the non-volitile memory of the controller.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE EMBODIMENTS

Figure 1:
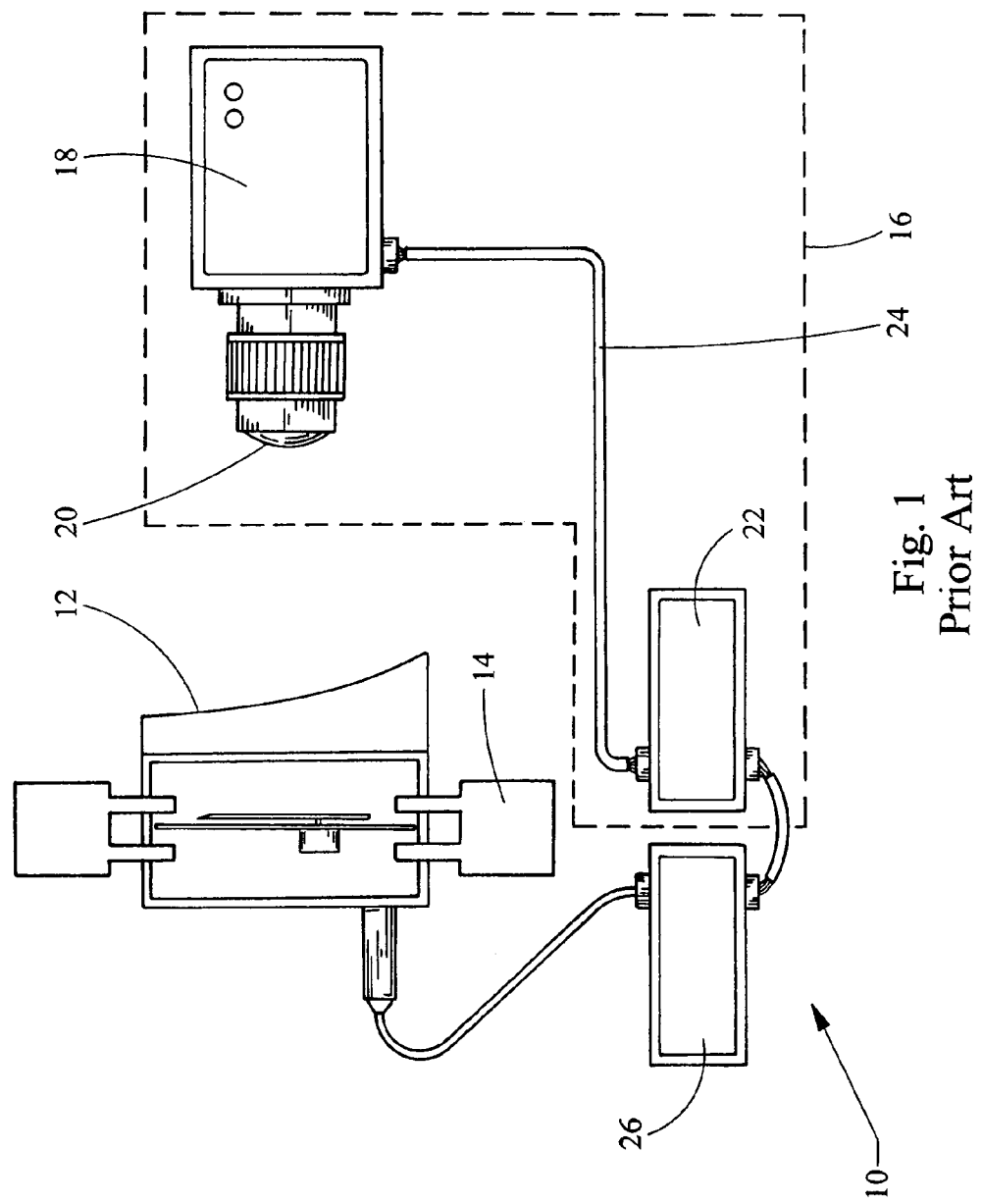
FIG. 1 is a schematic view of a prior art system for calibrating a gauge assembly.
Figure 2:
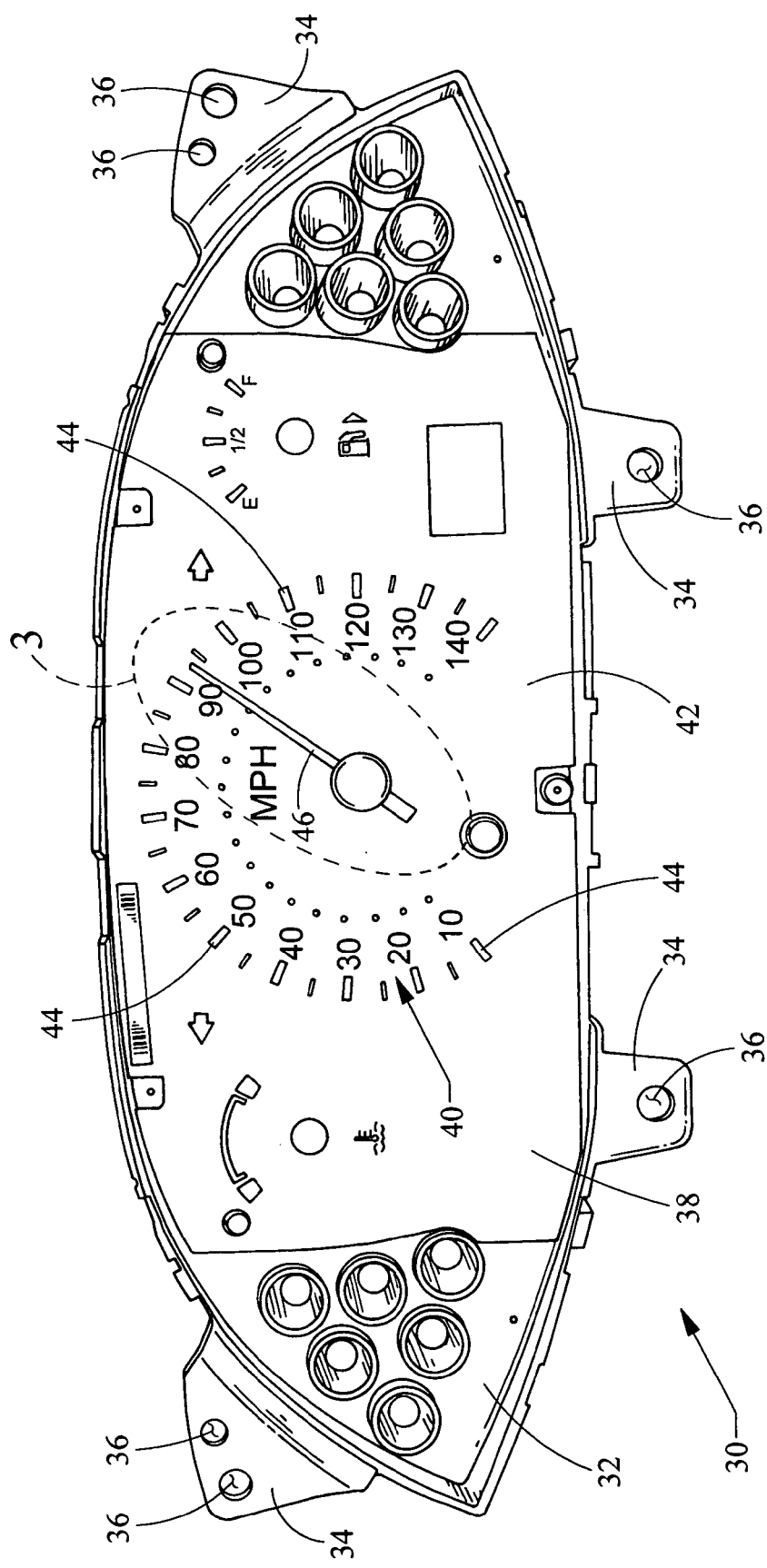
FIG. 2 is a front view of an instrument panel gauge assembly of the present invention.
Figure 3:
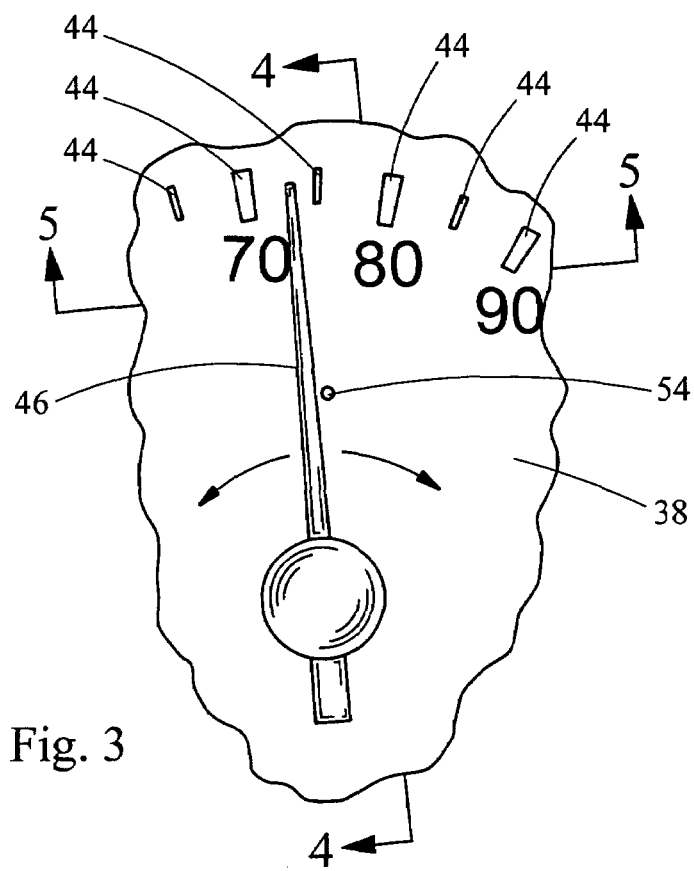
FIG. 3 is an enlarged portion of FIG. 2, as indicated by the encircled area of FIG. 2 labeled "3"

Referring to FIG. 2, an instrument panel gauge assembly according to the teachings of the present invention is shown generally at 30. The instrument panel gauge assembly 30 includes a rear housing 32. The rear housing 32 is preferably made from plastic and includes features that allow the instrument panel gauge assembly 30 to be mounted within an automotive vehicle. As shown, the rear housing 32 includes tabs 34 extending therefrom that include holes 36 formed therein to allow the instrument panel gauge assembly 30 to be mounted within the instrument panel of a vehicle with fasteners. The rear housing 32 is adapted to support various lights and the gauges for the instrument panel gauge assembly 30.

An applique 38 is mounted onto the rear housing 32. The applique 38 includes gauge graphics 40 printed on a front surface 42 thereof. Specifically, the applique 38 includes the numbers, letters, or symbols that correspond to the gauges of the assembly 30. As shown, the instrument panel gauge assembly 30 includes a speedometer in the center of the applique 38. The graphics 40 for the speedometer include tick marks 44 and numbers indicating how fast the vehicle is going. Lights (not shown) are mounted onto the rear housing 32, behind the applique 38, to back light the graphics 40 printed on the applique 38.

Referring to FIGS. 2, 3, 4, and 5, a needle pointer 46 for the gauge assembly is positioned adjacent the front surface 42 of the applique 38. The speedometer gauge assembly 48 is mounted onto the rear housing 32, behind the applique 38. A shaft 50 of the speedometer gauge assembly 48 extends from the speedometer gauge assembly 48 through a hole 52 formed in the applique 38. The needle pointer 46 is mounted onto a distal end of the shaft 50 such that rotation of the shaft 50 will cause the needle pointer 46 to move relative to the graphics 40 on the applique 38, thereby indicating the speed of the vehicle to the operator.

Figure 5:
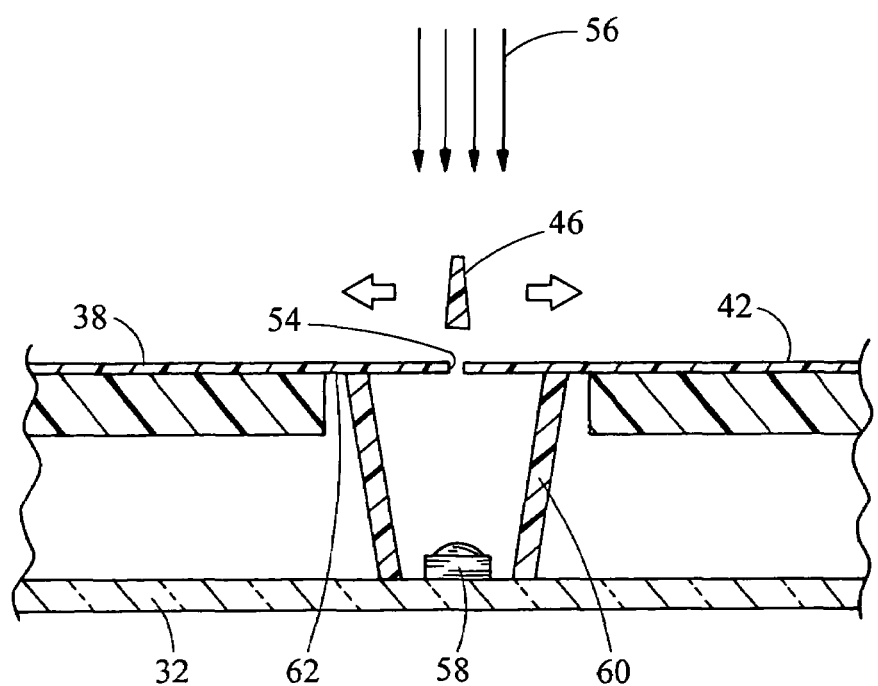
FIG. 5 is a portion of a side sectional view of the gauge assembly taken along line 5-5 of FIG. 3.

A transparent chaplet 54 is formed within the applique 38. The transparent chaplet 54 allows ambient light 56 to pass through the applique 38. The transparent chaplet 54 is positioned such that the needle pointer 46 passes over the transparent chaplet 54 as the needle pointer 46 moves relative to the applique 38. As shown, the transparent chaplet 54 is round and has a diameter that is smaller than the width of the needle pointer 46. The transparent chaplet 54 can be any size and shape relative to the needle pointer 46 such that when the needle pointer 46 is positioned directly in front of the transparent chaplet 54 ambient light is substantially blocked from passing through the transparent chaplet 54. Referring to FIG. 5, the ambient light 56 is substantially blocked from passing through the transparent chaplet 54 by the needle pointer 46.

A light sensing element 58 is mounted onto the rear housing 32, directly behind the transparent chaplet 54 formed within the applique 38. The light sensing element 58 can be a photoresistor, a photodiode, a phototransistor, or any appropriate sensor that is adapted to detect the presence of light 56 passing through the transparent chaplet 54. A light baffle 60 is positioned behind the applique 38 to guide the light 56 that passes through the transparent chaplet 54 to the light sensing element 58. As shown, the light baffle 60 is conical shaped and extends from a rear surface 62 of the applique 38 to the surface of the rear housing 32 onto which the light sensing element 58 is mounted. The light sensing element 58 is positioned within the conical shaped light baffle 60, such that the light passing through the transparent chaplet 54 is funneled down to the light sensing element 58.

Figure 4:
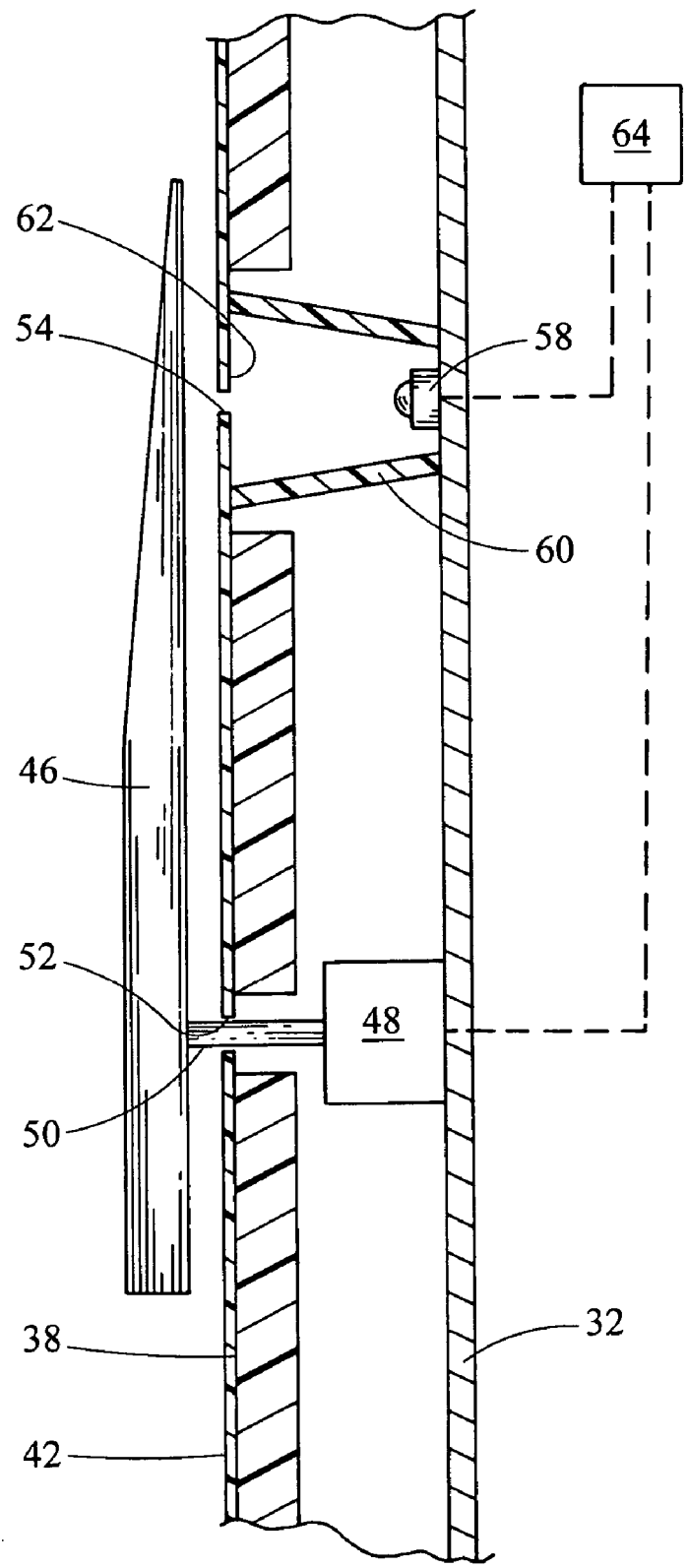
FIG. 4 is a side sectional view of a portion of the gauge assembly taken along line 4-4 of FIG. 3.

The instrument panel gauge assembly 30 also includes a controller 64. Referring to FIG. 4, the controller 64 communicates with both the gauges assembly 48 and the light sensing element 58. The controller 64 receives a signal from the light sensing element 58 to indicate when the needle pointer 46 is directly in front of the transparent chaplet 54. The light sensing element 58 sends a signal that has a variable voltage corresponding to the amount of light that the light sensing element 58 is receiving. The light sensing element 58 is capable of sending at least two distinct signals. A first signal indicates that the light sensing element 58 is receiving light. This signal tells the controller 64 that the needle pointer 46 is not positioned directly in front of the transparent chaplet 54. A second signal indicates that the light sensing element 58 is not receiving light. This signal tells the controller 64 that the needle pointer 46 is positioned directly in front of the transparent chaplet 54.

When the controller 64 gets the signal from the light sensing device 58 indicating that the needle pointer 46 is directly over the transparent chaplet 54. The controller 58 compares the actual input that is being sent to the gauge 48 to the position of the needle pointer 46 relative to the graphics 40 on the applique 38 to detect an error. When the needle pointer 46 is directly in front of the transparent chaplet 54, the controller 64 knows the exact position of the needle pointer 46. The controller 64 compares the value of that position to the value that the gauge 48 is actually receiving and should be displaying. In this way, the controller 64 can detect when the gauge 48 is incorrect, and account for it by calculating a correction factor and calibrating the gage 48 to accommodate for the error.

The controller 64 includes autocalibration algorithms that are adapted to feed a known signal to the gauge assembly 48 to cause the needle pointer 46 to move, read an input from the light sensing element 58, compare the input from the light sensing element 58 to the position of the needle pointer 46, and calculate a correction factor that is stored in the non-volitile memory of the controller 64.

A method of internally auto calibrating an instrument panel gauge assembly 30 includes providing an applique 38 having gauge graphics 40 printed thereon and a needle pointer 46 for a gauge assembly 48. The applique 38 has a transparent chaplet 54 formed therein to allow ambient light to pass through the applique 38, wherein the transparent chaplet 54 is positioned such that the needle pointer 46 passes over the transparent chaplet 54 as the needle pointer 46 moves relative to the applique 38. The transparent chaplet 54 is sized relative to the width of the needle pointer 46 such that when the needle pointer 46 is positioned directly in front of the transparent chaplet 54, ambient light 56 is substantially blocked from passing therethrough.

A light sensing element 58 and a controller 64 are provided. The light sensing element 58 is positioned behind the applique 38 to detect the presence of light passing through the transparent chaplet 54 formed within the applique 38 and to send a corresponding signal to the controller 64. The light sensing element 58 senses the presence of light passing through the transparent chaplet 54 within the applique 38 and sends a corresponding signal to the controller 64. Simultaneously, a known signal is sent from the controller 64 to the instrument panel gauge assembly 30, thereby causing the needle pointer 46 to move to a position relative to the applique 38. The controller 64 compares the known signal to the signal from the light sensing element 58, calculates a correction factor, stores the correction factor in the non-volitile memory of the controller 64, and calibrates the gauge 48 accordingly.

In accordance with the provisions of the patent statutes, the present invention has been described in what is considered to represent its preferred embodiment. However, it should be noted that the invention can be practiced otherwise than as specifically illustrated and described.

What is claimed is:

1. An instrument panel gauge assembly comprising:

an applique having gauge graphics printed thereon;

a needle pointer for a gauge assembly;

a transparent chaplet formed within the applique to allow ambient light to pass through the applique, the transparent chaplet being positioned such that the needle pointer passes over the transparent chaplet as the needle pointer moves relative to the applique, the transparent chaplet being sized relative to the width of the needle pointer such that when the needle pointer is positioned directly in front of the transparent chaplet, ambient light is substantially blocked from passing through the transparent chaplet;

a light sensing element positioned behind the applique to detect the presence of light passing through the transparent chaplet formed within the applique;

a light baffle positioned behind the applique and adapted to guide light passing through the transparent chaplet to the light sensing element;

a controller, the light sensing element adapted to send a signal to the controller indicating when the needle pointer is directly in front of the transparent chaplet based upon the absence of light passing through the transparent chaplet, the controller further adapted to compare the actual input to the gauge with the position of the needle pointer, calculate a correction factor, and calibrate the gauge accordingly.

2. The instrument panel gauge assembly of claim 1, wherein the light sensing element is one of a photoresistor, a photodiode, and a phototransistor that is adapted to send a signal to the controller for a voltage corresponding to the light that the light sensing element is receiving.

3. The instrument panel gauge assembly of claim 2, wherein the light sensing element is adapted to send two signals, a first signal to indicate that the light sensing element is receiving light, indicating that the needle pointer is not positioned directly in front of the transparent chaplet, and a second signal to indicate that the light sensing element is not receiving light, indicating that the needle pointer is positioned directly in front of the transparent chaplet.

4. The instrument panel gauge assembly of claim 1 wherein the light sensing element is mounted onto a surface behind the applique, the light baffle being conical shaped and extending from a rear surface of the applique to the support surface onto which the light sensing element is mounted, the light sensing element being positioned within the conical shaped light baffle.

5. The instrument panel gauge assembly of claim 1, wherein the controller includes autocalibration algorithms adapted to feed a known signal to the gauge assembly to cause the needle pointer to move, read an input from the light sensing element, compare the signal to the position of the needle pointer, and calculate a correction factor that is stored in the non-volitile memory of the controller.

6. A method of internally auto-calibrating an instrument panel gauge assembly comprising:

providing an applique having gauge graphics printed thereon and a needle pointer for a gauge assembly, the applique having a transparent chaplet formed therein to allow ambient light to pass through the applique, the transparent chaplet being positioned such that the needle pointer passes over the transparent chaplet as the needle pointer moves relative to the applique, the transparent chaplet being sized relative to the width of the needle pointer such that when the needle pointer is positioned directly in front of the transparent chaplet, ambient light is substantially blocked from passing through the transparent chaplet;

providing a light sensing element positioned behind the applique to detect the presence of light passing through the transparent chaplet formed within the applique and to send a corresponding signal;

providing a controller;

sensing the presence of light passing through the transparent chaplet within the applique and sending a corresponding signal to the controller, simultaneously sending a known signal from the controller to the instrument panel gauge assembly, thereby causing the needle pointer to move to a position relative to the applique;

comparing the known signal to the signal from the light sensor;

calculating a correction factor and storing the correction factor in a non-volitile memory of the controller, and calibrating the gauge accordingly.

7. The method of internally auto-calibrating an instrument panel gauge assembly of claim 6, wherein providing a light sensing element includes providing a light sensing element that is one of a photoresistor, a photodiode, and a phototransistor that is adapted to send a signal to the controller for a voltage corresponding to the light that the light sensing element is receiving.

8. The method of internally auto-calibrating an instrument panel gauge assembly of claim 7, wherein sensing the presence of light passing through the transparent chaplet within the applique and sending a corresponding signal to the controller includes sending one of a first signal and a second signal, the first signal indicating that the light sensing element is receiving light and the needle pointer is not positioned directly in front of the transparent chaplet, the second signal indicating that the light sensing element is not receiving light and the needle pointer is positioned directly in front of the transparent chaplet.

9. The method of internally auto-calibrating an instrument panel gauge assembly of claim 6 wherein providing a light sensing element positioned behind the applique includes mounting the light sensing element onto a support surface behind the applique, the method further including providing a conical shaped light baffle and mounting the light baffle such that the light baffle extends from a rear surface of the applique to the support surface onto which the light sensing element is mounted and mounting the light sensing element within the conical shaped light baffle.

* * * * *